Aug. 2, 1960 W. T. HARRIS ET AL 2,947,890
TRANSDUCER
Filed March 25, 1957 2 Sheets-Sheet 1
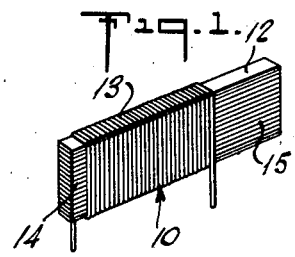
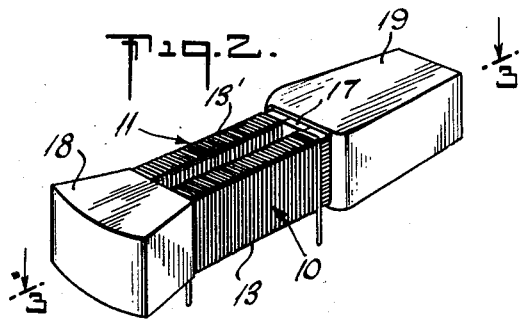
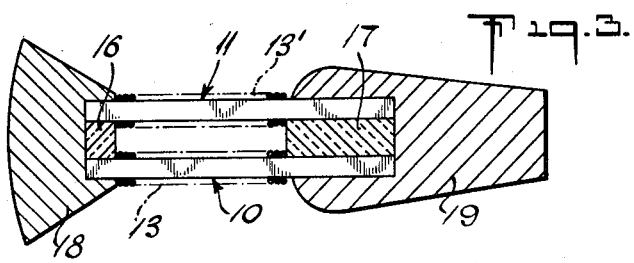
INVENTORS
WILBUR T. HARRIS
PHILIP B. EDWARDS
BY
ATTORNEYS Aug. 2, 1960    W. T. HARRIS ET AL    2,947,890
TRANSDUCER Filed March 25, 1957    2 Sheets-Sheet 2

INVENTORS
WILBUR T. HARRIS
PHILIP B. EDWARDS
BY
Mitchell + Bechert
ATTORNEYS

United States Patent Office 2,947,890
Patented Aug. 2, 1960

2,947,890

TRANSDUCER

Wilbur T. Harris, Southbury, Conn., and Philip B. Edwards, Berryville, Va., assignors to The Harris Transducer Corporation, Woodbury, Conn., a corporation of Connecticut Filed Mar. 25, 1957, Ser. No. 648,103

15 Claims. (Cl. 310—26)

Our invention relates to an improved electromechanical transducer element (as for underwater acoustic application). This invention incorporates improvements over that disclosed in application Serial No. 475,462, filed December 15, 1954, in the name of Wilbur T. Harris, and is related to Harris application Serial No. 559,657, filed January 17, 1956. This application is a continuation-in-part of our copending application, Serial No. 558,947, filed January 13, 1956.

It is an object to provide an improved transducer element.

It is also an object of the invention to provide an improved magnetostrictive transducer construction in which there may be very substantial economies in the use of magnetostrictive material.

Another object is to provide an improved transducer construction for which the production of scrap of magnetostrictive material is reduced to virtually nothing.

A further object is to provide a magnetostrictive transducer construction in which relatively inexpensive non-magnetostrictive materials may be used in substantial proportions.

It is also an object to provide an improved magnetostrictive transducer construction featuring a closed magnetic loop and yet permitting electrical winding by means of conventional coil-winding techniques.

A specific object is to provide an improved transducer construction in which core-leg elements may be individually wound before the magnetic circuit is fully assembled.

It is a specific object to achieve the above objects with a structure which in no sense impairs the high efficiency of the ultimate product.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a perspective view of a wound consolidated stack of laminations produced according to the present invention;

Fig. 2 is a perspective view of a complete transducer element utilizing two wound stacks which may each be of the type shown in Fig. 1;

Fig. 3 is a horizontal sectional view in the plane 3—3 of Fig. 2; and

Figure 4:
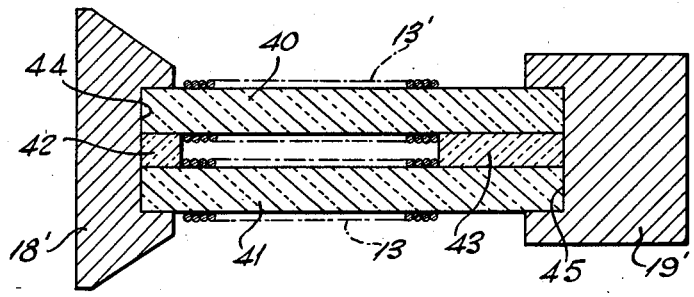
Figs. 4 and 5 are views similar to Fig. 3 but illustrating modifications.

Briefly stated, our invention contemplates application to a magnetostrictive transducer element comprising two laterally spaced like elongated magnetostrictive legs, with separate magnetic-flux-conducting elements bonded to and spacing the corresponding ends of the legs, thereby completing the magnetic circuit. The central parts of the respective legs are individually wound, and counterweights (head and tail weights) are bonded to the unwound longitudinal ends of the magnetic circuit.

In one general form of the invention the magnetostrictive legs are built up from a plurality of laminations of magnetostrictive strip material which may be sheared from a continuous supply of such material. In the other general form of the invention the magnetostrictive legs are separate castings of magnetostrictive ceramic, such as a suitable ferrite, and the assembly is otherwise generally the same.

Referring to Figs. 1, 2 and 3 of the drawings, our invention is shown in application to a transducer comprising two like, laterally spaced, longitudinally extending magnetostrictive legs 10—11. Each such leg may comprise a vertical stack of like laminations 12, and Fig. 1 suggests that an independent electrical winding 13 may be applied to central parts of the stack 10 prior to assembly of the stack to the rest of the magnetic circuit. The magnetic circuit is completed by bonding the unwound longitudinal ends 14—15 of the stacks 10—11 to spacer blocks 16—17 of magnetic-flux-conducting material. We prefer that these spacer blocks be ferrites and that one of them, say the block 17, be a ferrite permanent magnet. Blocks 17 should be of sufficient thickness (determining lateral spacing of stacks 10—11) to supply the required magnetomotive force, and of width (longitudinally along the transducer elements 10—11) sufficient to pass the required magnetic flux. The ferrite block 16 should be magnetically soft and have high permeability, high saturation-flux density, and low coercive force. The mechanical assembly is completed by applying a solid head weight 18 to one longitudinal end and a solid tail weight 19 to the other longitudinal end. Each of the counterweights 18—19 may be precision cast, with a recess or cavity formed to closely receive the unwound projecting ends of the elements 10—11, and the assembly is retained by bonding in the position shown in Fig. 3. The head element 18 is preferably of light non-magnetic metal, such as aluminum, and the tail weight 19 is preferably of relatively heavy non-magnetic metal, such as a zinc alloy. Electrical assembly is completed by connecting the windings 13—13' for the two legs 10—11 in a manner to aid in flux circulation around the core 10—16—11—17.

In operation, the transducer element of Fig. 3 may form part of an array of like elements, with the head weights 18 in side-by-side relation, and with a flexible diaphragm or boot (acoustically transparent to water or other liquid medium in which the array is to be immersed) extending over the faces of all heads 18 of the array. As far as each such element is concerned, end-for-end symmetrical loading is not necessary and is not intended; thus, the head weight 18 is preferably lighter than the tail weight 19, even when the radiation load is added to the head weight 18. With such proportioning, i.e. if the head, with its radiation load, is lighter than the tail 19, then higher displacement amplitude and greater radiation resistance may be realized.

As indicated generally above, the use of separate legs 10—11 lends our laminated-leg construction to relatively high speed mass production, both as to the fabrication of the legs proper and the application thereto of the electrical windings 13. The individual laminations 12 may be sheared from continuous lengths of magnetostrictive material, stacked upon one another in desired number, suitably heat treated, and bonded to one another to form the completed legs. The windings 13 may be applied to each leg 10—11 individually, by means of conventional winding equipment. The rectangular shape of each leg, and of the laminations which form the legs, facilitate the application of the electrical windings 13 and also permit the formation of the individual laminations substantially without waste.

Figure 5:
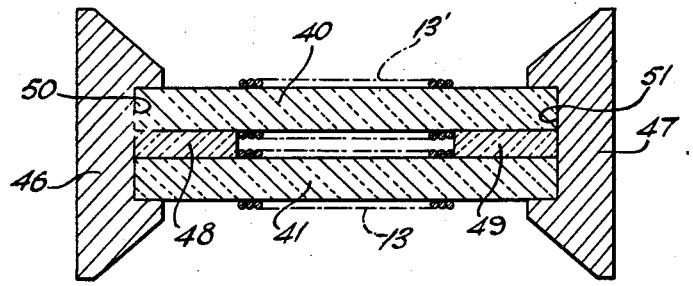

In Figs. 4 and 5, we show modifications in which the basic core legs 40—41 are of magnetostrictive ceramic, cast as single pieces (slabs or blocks) into the rectangular prismatic shape shown; the ceramic of legs 40—41 is preferably of magnetically soft material (i.e. not permanent-magnet material), such as pure nickel ferrite ($NiFe_2O_4$). In the form of Fig. 4, which corresponds magnetically to that of Fig. 3, inserts 42—43 of magnetic flux-conducting material (corresponding to inserts 16—17 in Fig. 3) magnetically connect corresponding longitudinal ends of legs 40—41. Inserts 42—43 may be of ferrite, block 43 being permanently magnetized and block 42 serving merely as a coupling device; in that event, the material of block 43 is preferably a barium ferrite ($BaFe_2O_4$), and the coupling block 42 is preferably a manganese-zinc ferrite. Inserts 42—43 thus complete a polarized flux path, and, for efficiency, winding means 13—13' may be developed along legs 40—41. Head and tail weights 18'—19' of the general proportions discussed at 18—19 in Fig. 3 may be bonded (as by an epoxy resin) to the longitudinal ends of the assembled core, and inserts 42—43 are preferably similarly bonded in place. Extensive-surface bonding is achieved by fitting the wound-core ends in suitable recesses 44—45 in the head and tail weights 18'—19'.

In the arrangement of Fig. 5, the head and tail weights 46—47 are of preferably matched proportions, in order to illustrate the device for use as a bidirectional radiator, that is, for like (but opposed) radiation at both longitudinal ends. The coupling and/or polarizing elements 48—49 are similarly matched, to develop end-for-end mechanical symmetry. Bonding is as described for Fig. 4, wherein the wound-core ends are received in suitable recesses 50—51 in the head and tail weights 46—47.

Figs. 4 and 5 may also be viewed as illustrative of an embodiment of the invention wherein one or both of the legs 40—41 are permanently magnetized, and the inserts 42—43 (or 48—49) are merely unpolarized couplers, in order to complete the magnetic flux path. In such event, the material of the polarized leg is preferably a nickel ferrite having a relatively small addition of cobalt ferrite, while the couplers are preferably of a manganese-zinc ferrite. It will be understood that for end-for-end mechanical symmetry, as aforesaid, both elements 48—49 may be polarized or both legs 40—41 may be polarized, depending upon which of the above-mentioned employments of Fig. 6 is selected.

It will be seen that we have described improved transducer elements. Our new construction achieves important economies by employing magnetostrictive material only for longitudinally movable parts of the magnetic circuit. There is no waste of magnetostrictive material on any other part of the structure. Our construction lends itself to relatively inexpensive conventional coil-winding techniques, and since (for the laminated embodiment) the individual laminations may be purely rectangular and without shape complications, there is virtually no scrap, and still further economies are realized.

While we have described the invention in detail for the preferred forms illustrated, it will be understood that modifications may be made within the scope of the invention as defined in the claims which follow.

We claim:

1. In an electromechanical transducer, a substantially continuous and closed magnetic flux-path core comprising a pair of individual laterally spaced elongated legs of magnetostrictive material, said legs having a width measured in the direction of the spacing between said legs and a height measured in a direction substantially at right angles to said width, said legs defining substantially continuous flux-transmitting paths therethrough over a plurality of planes extending widthwise of said legs from opposing edges of said legs outwardly for appreciable distances, a pair of separate magnetic connecting elements each formed of magnetic flux conducting material and connected between said legs respectively at longitudinally spaced portions thereof, each of said magnetic connecting elements extending along the height of said legs for a substantial distance in close flux-conducting adjacency with a plurality of said flux-transmitting planar paths at said opposed edges of said legs, means for magnetically polarizing said core, winding means linked to said legs, and end counterweights bonded to the opposite ends of said core.

2. The transducer of claim 1, in which said legs are formed of a single block of magnetostrictive material.

3. The transducer of claim 2, in which one of said magnetic connecting elements is permanently magnetized and comprises said magnetic polarizing means.

4. The transducer of claim 2, in which one of said legs is permanently magnetized and comprises said magnetic coupling means.

5. The transducer of claim 2, in which said end counterweights are recessed, said respective longitudinal ends of said legs and a portion of at least one of said magnetic connecting elements are received therein.

6. The transducer of claim 2, in which the end counterweights bonded to the opposite ends of said core are of different weights from one another.

7. The transducer of claim 1, in which said legs are formed from a plurality of laminations planarly oriented in the direction of and comprising said flux-transmitting planar paths.

8. The transducer of claim 7, in which one of said magnetic connecting elements is permanently magnetized and comprises said magnetic polarizing means.

9. The transducer of claim 7, in which one of said legs is permanently magnetized and comprises said magnetic coupling means.

10. The transducer of claim 7, in which said end counterweights are recessed, said respective longitudinal ends of said legs and a portion of at least one of said magnetic connecting elements are received therein.

11. The transducer of claim 7, in which the end counterweights bonded to the opposite ends of said core are of different weights from one another.

12. The transducer of claim 1, in which one of said magnetic connecting elements is permanently magnetized and comprises said magnetic polarizing means.

13. The transducer of claim 1, in which one of said legs is permanently magnetized and comprises said magnetic coupling means.

14. The transducer of claim 1, in which said end counterweights are recessed, said respective longitudinal ends of said legs and a portion of at least one of said magnetic connecting elements are received therein.

15. The transducer of claim 1, in which the end counterweights bonded to the opposite ends of said core are of different weights from one another.

References Cited in the file of this patent

UNITED STATES PATENTS

| Number | Name | Date |
| --- | --- | --- |
| 1,775,053 | Schwenzer | Sept. 2, 1930 |
| 1,877,254 | Ritter | Sept. 13, 1932 |
| 1,997,193 | Kato et al. | Apr. 9, 1935 |
| 2,057,503 | Sawyer | Oct. 13, 1936 |
| 2,085,092 | Furth | June 29, 1937 |
| 2,116,522 | Kunze | May 10, 1938 |
| 2,293,951 | Seastone et al. | Aug. 25, 1942 |
| 2,387,943 | Putman | Oct. 30, 1945 |
| 2,391,678 | Bundy | Dec. 25, 1945 |
| 2,423,345 | Roters | July 1, 1947 |
| 2,423,869 | Blessing | July 15, 1947 |
| 2,551,711 | Snoek et al. | May 8, 1951 |
| 2,818,514 | Goertz et al. | Dec. 31, 1957 |
| 2,830,267 | Broussaud et al. | Apr. 8, 1958 |
| 2,890,354 | McCown et al. | June 9, 1959 |